Figure 1:
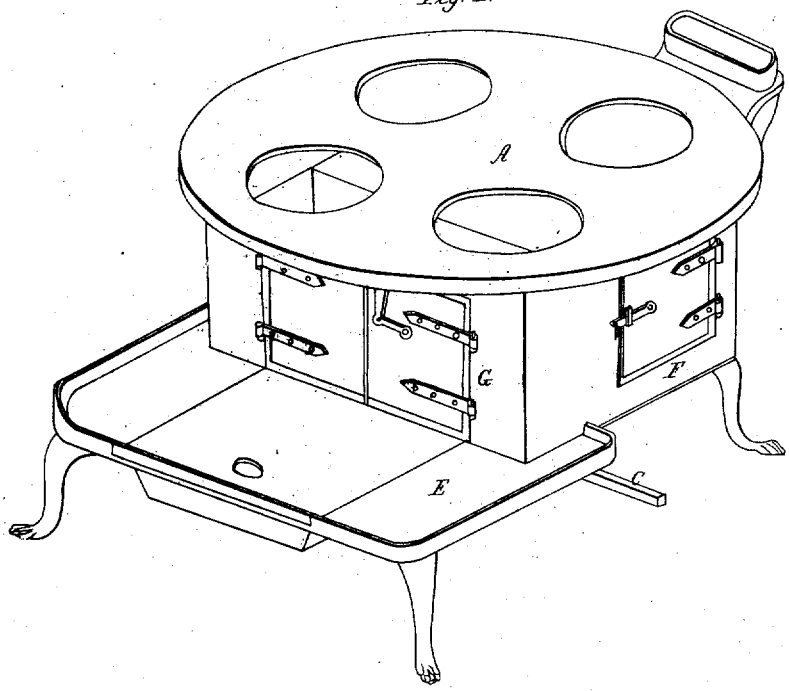
Figure 2:
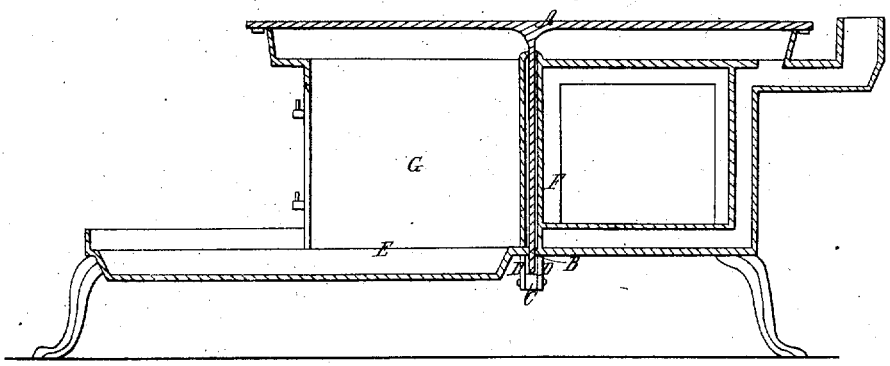
Figure 3:
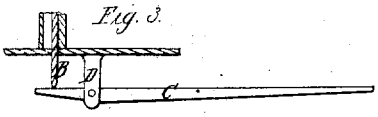

8206X

E. Town,

Cook Stove.

Patented May. 16. 1834.

8206X May 16 1834

Elisha Town of Montpelier Vermont
Letters Patent.

The Schedule referred to in these Letters Patent and making part of the same containing a description in the words of the said Elisha Town himself of his improvement called "Towns Rotary Stove".

To all persons to whom these presents shall come. Elisha Town of Montpelier in the County of Washington and State of Vermont, Gentleman. sends Greeting. Be it known that I the said Elisha Town have invented constructed made and applied to use a new and useful improvement in Cooking stoves. called "Towns Rotary Stove" Specified in the words following to wit, this improvement in cooking stoves consists. First of a fire room proportioned to the size of the Stove. and the fuel to be used therein, with an oven back of and upon a level with the same. above and below which oven the heat and smoke passes towards the flue in the back plate of the stove. Second. in having a circular projection on each side of the plate which covers the oven and a part of the fire room. upon the upper side and at or near the edge of which plate there is a circular rim raised sufficiently high to permit a portion of the heat and smoke to pass over the oven to the flue and also to permit the boilers kettles and other cooking utensils, that may be put into the rotary plate to pass over the top of the oven. A large circular plate is placed over the fire room in such a manner that a segment of about one third of the diameter of the circular plate is occupied by the fire room. For the above described parts of the Stove I do not desire letters Patent, as I do not claim them as a part of my invention. Third. above the said circular rim and resting on the same is a circular rotary plate projecting a little beyond the said rim. which plate may be revolved by a centre pivot projecting therefrom down through the bottom plate of the Stove for the convenience of raising the rotary plate from its bearings; a lever attached to and underneath the bottom plate of the stove. into the bottom plate of the stove are two perpendicular pieces of iron inserted connected together at the bottom between which the lever runs acting on a pin running through said pieces of iron as a fulcrum. on the short arm of which lever rests the before described pivot. The rotary plate is constructed with holes or resting places therein for boiling Kettles & other cooking utensils. The principle for which we claim the inven-

[illegible] 8206X May 16, 1834 tion and for which I would ask Letters Patent of the United States is the cooking top plate or feature unto or on which are placed the principal utensils used in cooking and for other purposes to which the stove may be applied.

In testimony that the above is a true specification of my said improvement as above described. I have hereunto set my hand this twenty second day of April in the year of our Lord one thousand Eight hundred and thirty four.

Exd. Witnesses
W.C. Saml. B. Prentiss Elisha Town.
Jno. H. Prentiss

Drawing (570 words)